Sept. 28, 1926. Re. 16,432

F. E. SMITH

ENDLESS BELT CARRIER

Original Filed May 8, 1922 5 Sheets-Sheet 1

Witnesses:
Edwin Fruet

Inventor:
FRANK E. SMITH,
by: D. Anthony Lerna
his Attorney.

Sept. 28. 1926. Re. 16,432
F. E. SMITH
ENDLESS BELT CARRIER
Original Filed May 8, 1922 5 Sheets-Sheet 2
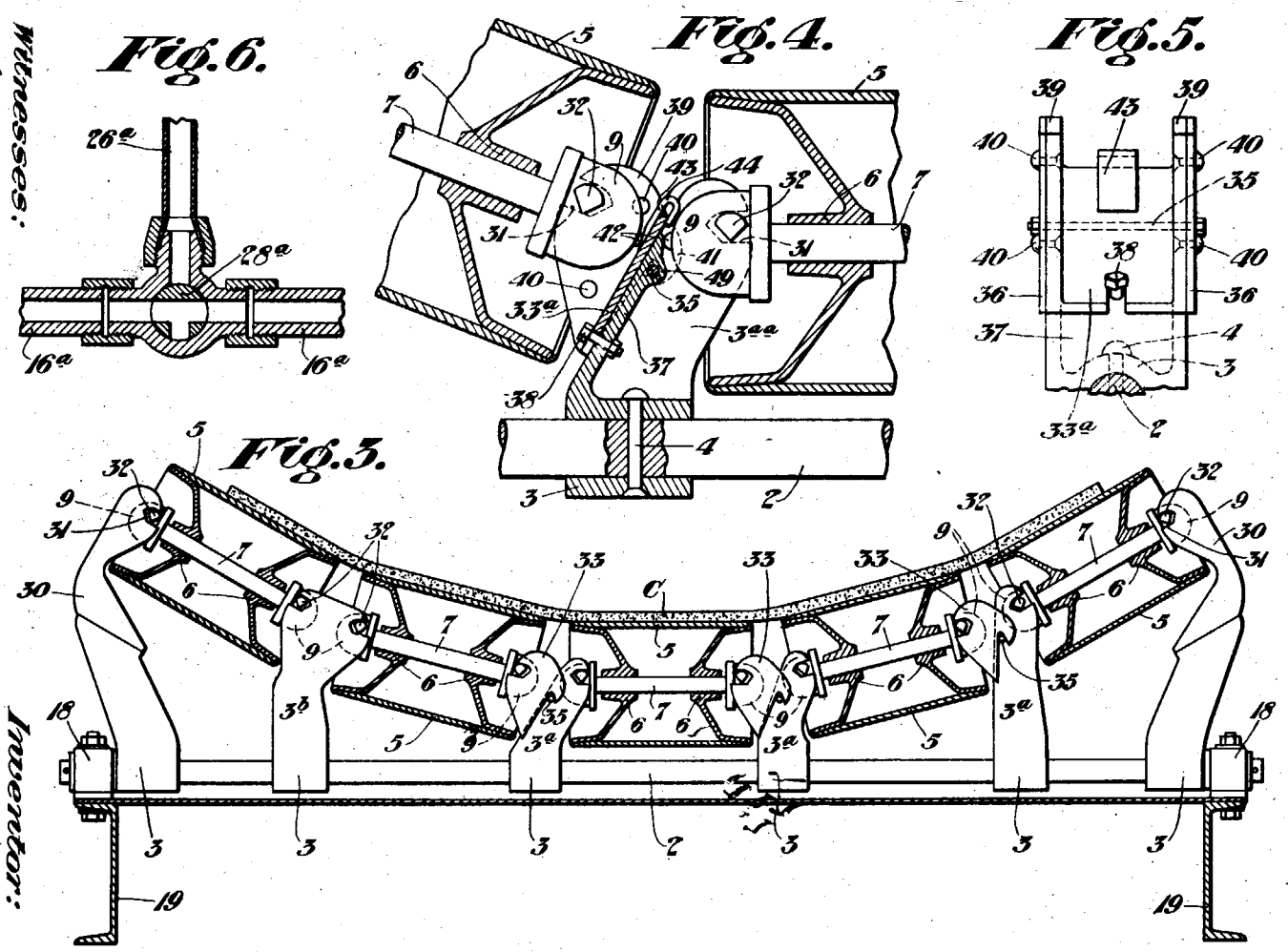
Witnesses:
Edwin Truet
Inventor:
FRANK E. SMITH,
by D. Anthony Hanna
his Attorney.

Sept. 28, 1926. Re. 16,432
F. E. SMITH
ENDLESS BELT CARRIER
Original Filed May 8, 1922 5 Sheets-Sheet 3
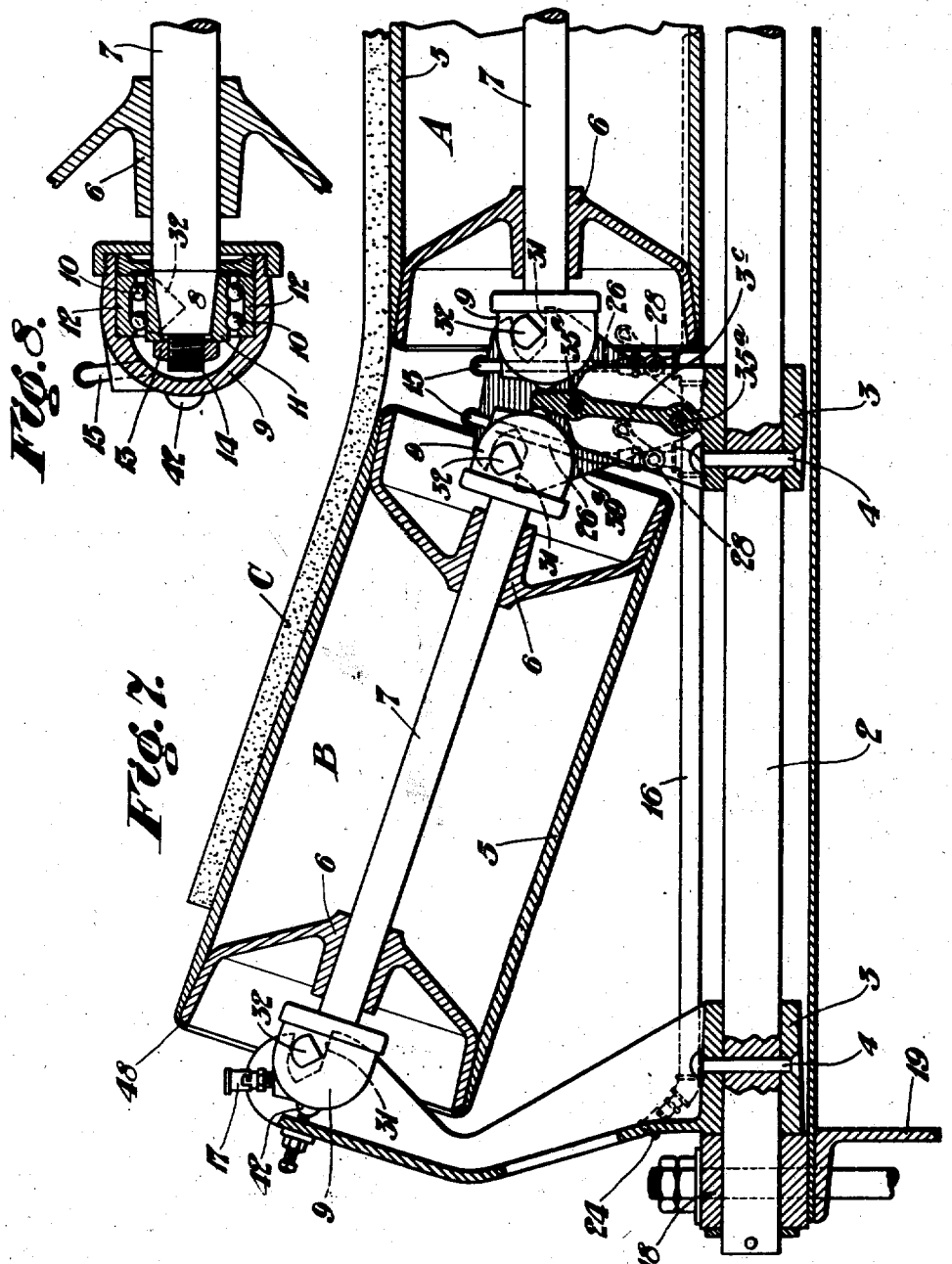
Witnesses:
Edwin Truet
Inventor:
FRANK E. SMITH,
by: D Anthony Lewis
his Attorney.

Sept. 28, 1926. Re. 16,432

F. E. SMITH

ENDLESS BELT CARRIER

Original Filed May 8, 1922 5 Sheets-Sheet 4

Witnesses:
Edwin Truet

Inventor:
FRANK E. SMITH,
by: D. Anthony Jr.
his Attorney.

Sept. 28, 1926. Re. 16,432

F. E. SMITH

ENDLESS BELT CARRIER

Original Filed May 8, 1922 5 Sheets-Sheet 5

Witnesses:
Edwin Trueb

Inventor:
FRANK E. SMITH,
by D. Anthony Lewis
his Attorney

Reissued Sept. 28, 1926. Re. 16,432

UNITED STATES PATENT OFFICE.

FRANK E. SMITH, OF SCOTTDALE, PENNSYLVANIA.

ENDLESS-BELT CARRIER.

Original No. 1,493,288, dated May 6, 1924, Serial No. 559,241, filed May 8, 1922. Application for reissue filed April 13, 1926. Serial No. 101,833.

My invention relates to the art of endless belt carriers, and refers particularly to the construction of the roller supports for the carrying belt.

In this art, it is customary to support the carrying belt by a continuous series of either single or multiple rollers having their axial centers arranged transversely across the carrying strand. In the case of single rollers, they are customarily horizontal, while some or all of the multiple rollers of each transverse series are usually arranged at varying inclinations at each side of the longitudinal center of the belt, to provide for "dishing."

In my invention I have provided means for mounting the carrying rollers whereby they may be erected to normal operative supporting position underneath the belt, or whereby one or all of the rollers of each series may be lowered for removal, adjustment, or repair. Also, means for properly mounting and supporting the bearing members for the several cross shafts of the rollers, means tending to a minimum of friction, means for lubricating the several bearing members, and other features hereinafter more fully described.

The objects in view, in addition to those noted, are to provide a simple, effective, and economical construction capable of giving the best results in continuous use and which may be lowered or erected without stoppage of the belt.

Certain preferred embodiments of the invention are illustrated in the accompanying drawings, in which:

Figure 3 is a similar view showing five carrying rollers with a corresponding arrangement of supports therefor;

Figure 4 is an enlarged sectional detail of one of the supporting brackets for the roller shaft bearings;

Figure 5 is a view of the bracket in elevation;

Figure 6 is a sectional detail view of one of the valve controlled branch connections of the lubricating pipe;

Figure 7 is a partial sectional view similar to Figure 4 showing a modified construction of supporting bracket;

Figure 8 is a sectional detail view of one of the friction reducing bearings for the roll spindle;

Figure 1:
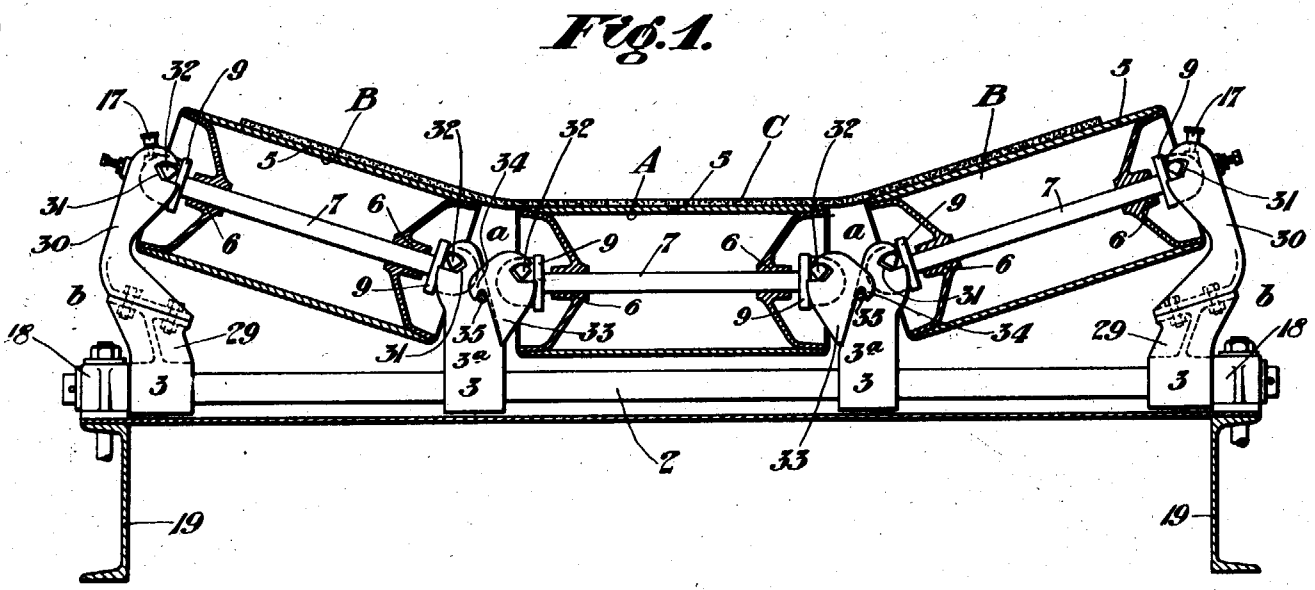
Figure 1 is a cross-sectional view showing three carrying rollers mounted in their several bearings and carried by their common tilting shaft.

Referring to Figure 1, showing a series of rollers A, B and B arranged in conventional series for carrying a belt conveyer in trough shape, the several rollers being mounted on a rock shaft 2, by outermost compound brackets *b*, *b*, and inner compound brackets, *a*, *a*, respectively. Each bracket is provided with a hub 3 embracing the shaft 2 and secured thereto in fixed alinement by securing pins or rivets 4, as in Figure 7.

The rollers A and B are of well-known construction, comprising an outer cylindrical or tubular shell 5 carried by the endmost flanges or hubs 6 upon shafts or spindles 7. These, in turn, are rotatably mounted by their terminals 8 in the ball or roller bearing casings 9 (Figure 8) by means of rolling members, as balls 10, engaging inner and outer bushings 11, 12, of the spindle and casing respectively, as will be readily understood. Bushing ring 11 is preferably clamped tightly on the coniform terminal 8 of shaft 7 by a nut 13 of its threaded extension 14, as shown, so that the shaft and its bushing are free to revolve in transmitting moving support to the conveyer belt C. The interior of each inner casing 9 is supplied with lubricant, as grease, by tubular conduit 15 connected with a main supply pipe 16, and the outermost bearing casings are lubricated directly by grease cups 17, as in Figures 1 and 7.

The several hubs 3 of brackets *a* and *b* are fixedly mounted in alinement on their supporting rock shaft 2, as stated, and shaft 2 is tiltingly mounted in end bearings 18, 18, carried by the outermost supporting members, as channels 19, of the supporting structure. A supporting cross member, which may be in the form of a shaft 20, is similarly mounted on the framework adjacent to each such shaft 2 on the same general level for each transverse roller, or set of rollers.

Figure 9:
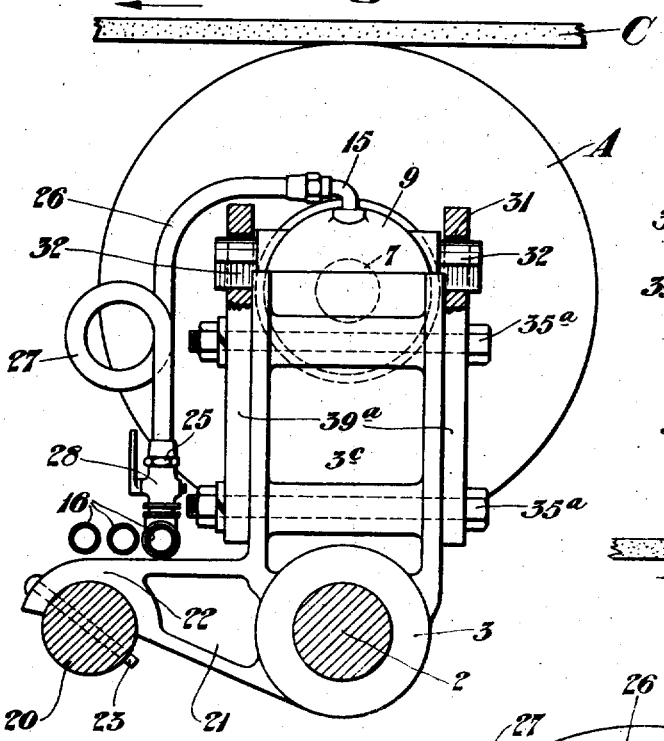
Figure 9 is a cross sectional view through the cross supporting shafts showing the roller supporting bracket in erected position thereon.
Figure 13:
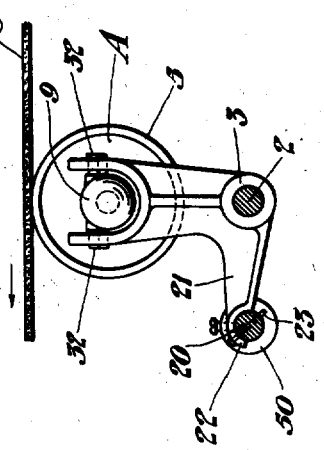
Figure 13 is a cross-section on the line XIII—XIII of Figure 12.

Each hub 3 has an extended supporting bracket arm 21 provided with a terminal open sided bearing 22, for supporting engagement on such member 20, when the brackets are erected, as in Figures 9 and 13. In such position, with the belt supported upon the rollers, and running in the direction indicated by the arrow, the brackets will normally press towards the cross member 20, but for positively securing them in lowered position, I use a removable pin 23 inserted through registering holes in the bracket bearing and cross member.

The main lubricant supply pipes 16, usually one for each set of bearings, lie across the bearing brackets and extend towards one side, where each is provided with a closing terminal cap 24, and adapted for connection with a grease gun or the like. Each main pipe 16 is connected as at 25, by a suitable union coupling, with a semi-flexible tube 26 having an elastic loop 27 to facilitate communicating connection by conduit 15 with the bearing. A cock or valve 28 is preferably inserted in the branch line 26 at any suitable point, as shown, Figure 7, for controlling the circulation to one or both bearings.

In the construction shown in Figure 1, the outermost hubs 3 are provided with upwardly extending brackets 29 having flanged attaching faces for bolting thereto the supplemental bearing brackets 30 carrying the outer bearing casings 9. Brackets 30 are bifurcated at their upper ends, providing a pair of side cheeks or ears having inwardly open sockets or slots 31 for reception of the lugs or trunnions 32 extending from opposite sides of the bearing casings 9.

Lugs 32 are substantially knife-edges at their lower supporting portions for equal balancing, and enter the slots 31 with slight clearance, as shown.

The sockets or slots 31 have their lower or bearing faces arranged so that they are in line with the longitudinal axis of the shafts 7, and the lugs or trunnions 32 are positioned on the casings 9 so that their lower or knife-edges are in line with the longitudinal axis of the shafts 7, and since the knife-edges of the trunnions 32 are positioned or mounted on the lower or bearing faces of the slots 31, the bearing casings 9 are supported so as to provide a balanced bearing for the shafts 7, which will permit free horizontal movement in a direction parallel and transverse of the longitudinal axis of the shaft and also a rocking movement without binding the shaft.

The intermediate hubs 3 also extend upwardly and are of compound construction, as shown, whereby to provide a bearing support for the inner downwardly sloping end of the outer roller spindle, and a separate bearing support for the end of the middle roll spindle. To this end, hub 3 is extended upwardly integrally by extension $3^a$ and is similarly bifurcated and slotted at 31 for supporting the lugs 32 of the inner bearing casing 9 of the outer roller.

Mounted on the inner side extension $3^a$ is a supplemental bracket 33, similarly bifurcated and slotted, and provided with side cheek lugs 34 embracing the extension $3^a$ and engaging lugs or bolt terminals 35. The bracket 33 extends downwardly along the inner face of extension $3^a$, providing abutting engagement therewith, so as to firmly support the roller spindle bearing.

The construction as shown in Figure 1 provides a similar bearing for each end of the roller spindle, of right and left hand form so that the middle horizontal roller is thus carried at its proper level between the outer upwardly sloping rollers.

By this arrangement, the entire series of rollers may be tilted backwardly on shaft 2 in receded position below the belt for adjustment, removal, or insertion of any individual roller or its bearings without interference or stoppage of the belt. Thus, either end roller B may be disconnected by removal of bracket 30 and disconnection of branch lubricant pipe 26, permitting the lugs 32 of rear bearing casing 9 to be withdrawn from openings 31. Likewise, by removing one of the brackets 33, the middle roller A may be withdrawn without removing the other bracket, first having disconnected the lubricant pipes as described.

Figure 2:
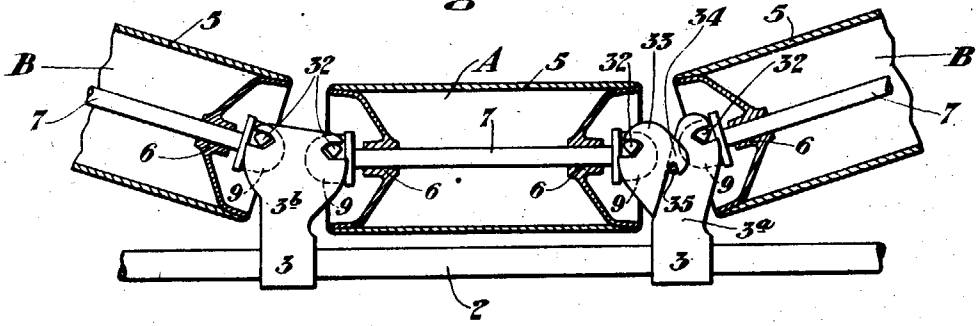
Figure 2 is a partial similar view showing a modified construction of supporting brackets.

If desired, one of the inner supporting bracket extensions may be made integral, as at $3^b$, with oppositely extending bifurcated and slotted cheeks for supporting engagement with the roller bearing casings, as shown at the left side of Figure 2. The other side, being separable as shown and as just described, provides for separability of either roller in lowered position of the brackets.

In Figure 3 I show an arrangement comprising five rollers, and their supporting brackets, utilizing a combination of the several bearings above described, adapted to the increased total width and varying inclination of the several rollers. In such construction, the outermost separable brackets 30 are somewhat higher relatively, the integral bracket $3^b$ is used between one outer roller and the next adjacent one, and compound brackets $3^a$—33 are used for the other intervening supports. In such arrangement, it is immaterial whether the removable bracket 33 be at one side or the other of the integral hub bracket. It is desirable, however, that a removable bracket be provided for one end of each roller, so as to facilitate easy removal and adjustment.

Figure 11:
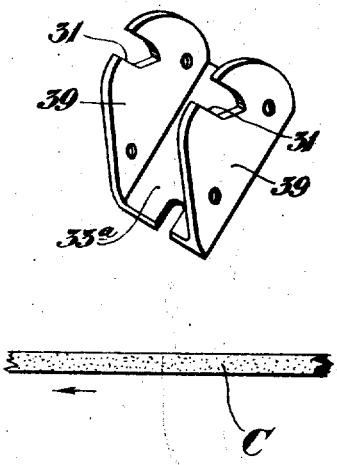
Figure 11 is a perspective detail view of one of the detachable supporting brackets like that of Figure 5, from the rear.
Figure 10:
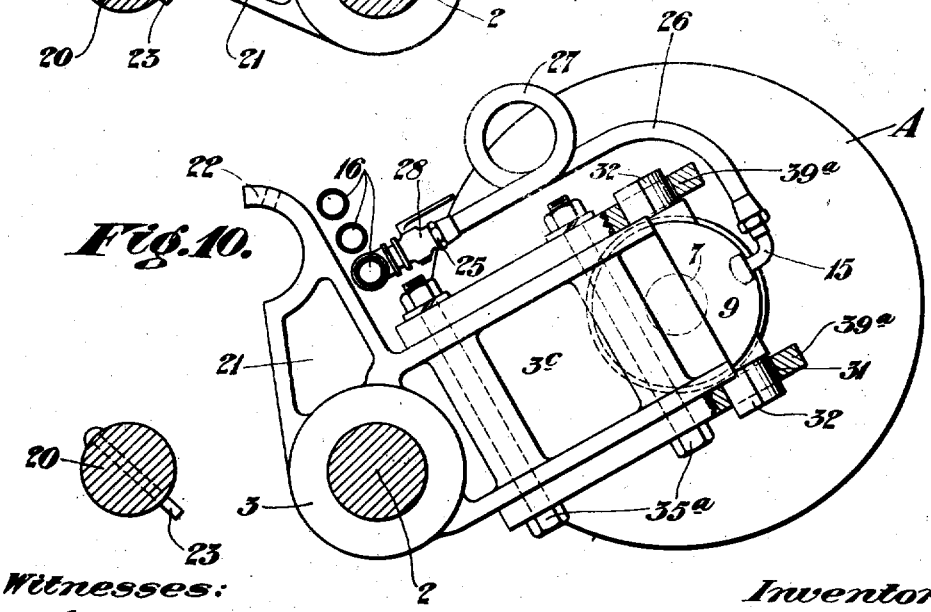
Figure 10 is a similar view showing the bracket and roller in lowered position.

In Figures 4, 5 and 11, I show a somewhat modified construction of compound supporting bracket consisting of a bracket extension $3^{aa}$ upwardly beyond hub 3 upon which is secured the removable bracket by its back web $33^a$ lying against the sloping face of the main bracket $3^{aa}$. The latter is reinforced as at 49, and provided with a transverse bolt 35 by which side plates 36, 36, are secured to the sloping back web 37. The supplemental bracket $33^a$ is slotted at the bottom for engagement of bolt 38, and its side cheeks 39, 39, are riveted to the side plates 36 as at 40. As an additional holding connection, the rear upper portions of side plates 36 are hooked over and secured by bolt 35 as indicated at 41.

A bearing boss or projection 42 extends rearwardly from bearing casing 9 against a wedge 43 adjustably inserted between the back and such boss whereby the bearing and the roll spindle are maintained outwardly in proper operative position. The wedge 43 is preferably hooked over the top edge of back plate of bracket $33^a$, as at 44, with sufficiently tight fit to insure against accidental removal. At the other side, the other bearing casing 9 bears against the rear top of the bracket $3^{aa}$ by its boss 42 and each casing is supported by its side lugs 32 in the slotted openings 31 of the respective side cheeks.

In Figure 7 I show a further modification in which the hub 3 extends upwardly by a middle web member $3^c$ to which are secured the outer side plates $39^a$ by transverse bolts $35^a$. Such side plates provide the embracing cheeks for the bearing castings and have the slotted openings 31 for reception and support of the lugs 32 thereof. The bearing casings, thus supported, are also braced against endwise movement by their projections 42 engaging against opposite sides of the upper portion of the web $3^c$.

In Figure 6 I show a detail of a continuous line pipe $16^a$ for lubrication, having branch pipe extensions $26^a$ and an intervening cock or valve $28^a$ with suitable couplings. By this means, a plurality of bearings 9 may be lubricated from a single pipe and any particular pair of bearings may be cut out and the branch connections temporarily removed, if desired.

Figure 14:
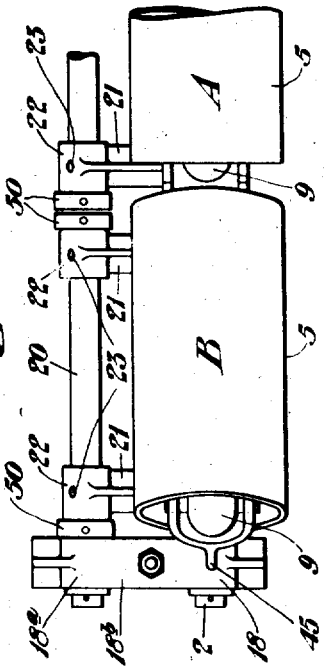
Figure 14 is a partial plan view of Figure 12.
Figure 12:
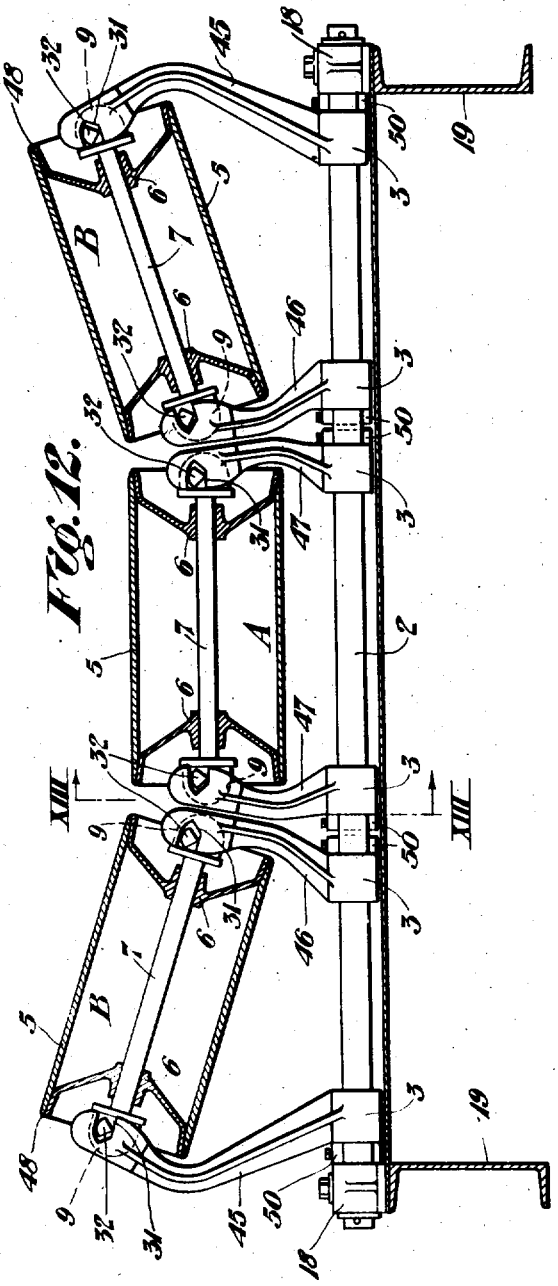
Figure 12 is a longitudinal sectional view showing a further modification utilizing independent or individual brackets for each roller respectively, providing for individual adjustment of each roller.

Figures 12, 13 and 14 show a slightly modified construction utilizing individual supporting brackets 45, 46 and 47 extending upwardly from their respective hubs 3, and of right and left hand form to suit their respective locations. Each hub is freely mounted on rock shaft 2 for rotation or endwise movement, and normally controlled by bearing collars 50, each having a tightening set-screw, on shaft 20. By this arrangement, the whole series of rollers may be thrown back at once, or by removing the screws 23 from any particular pair of bearings 22, such pair of brackets 21 and their particular roller may be thrown back independently of the others, and one of the brackets may be shifted laterally to remove the roller.

By either construction, I am enabled to adjust the roller or rollers upwardly towards and in contact with the belt, or downwardly away therefrom, without stoppage or interference. The manner of mounting and supporting the several brackets insures rigidity and stability of the roller structure when erected, and also facilitates the throwing of these elements backwardly and downwardly, with a minimum of friction and absence of interference or interruption to the continued operation of the carrier.

It will be understood that the bearing 18 for rock shaft 2 is fixedly spaced from its companion bearing $18^a$ by a connecting base plate $18^b$ by which the bearings are fixedly secured in such relation to the main framing structure 19.

One further feature of advantage is in the construction of the rollers A or B. These are preferably made of tubular sections of pipe and are turned down around the beveled or rounded edges of the flanges of hubs 6, as indicated at 48. Such construction insures concentric engagement and continuous connection with the hubs, overcoming any tendency to loosening or disarrangement.

It will be understood that the invention may be variously changed or modified in detail construction, or otherwise, by the skilled mechanic in adapting it to various applications of use, but that all such are to be considered as within the scope of the following claims.

What I claim is:

1. Supporting mechanism for a carrying belt consisting of a rock shaft having bearing supports extending upwardly therefrom having bifurcated slotted arms and a belt engaging roller carried thereby.

2. Supporting mechanism for a carrying belt consisting of a rock shaft having freely journaled bearing supports extending upwardly therefrom and provided with roller supporting brackets, a roller therein, and means limiting tilting movement of the roller brackets on the rock shaft.

3. Supporting mechanism for a carrying belt consisting of a belt supporting roller, brackets therefor, a freely journaled rock shaft for the brackets, and means for bracing the brackets in erected position and providing for backward tilting movement on the rock shaft.

4. In combination with a supporting framework, a transverse rock shaft, bearings therefor, brackets freely journaled onto the rock shaft extending upwardly therefrom and provided with supporting terminals, and a belt carrying roller mounted therein.

5. In combination with a supporting framework, a transverse rock shaft, bearings therefor, brackets freely journaled onto the rock shaft extending upwardly therefrom and provided with supporting terminals, shaft casings mounted in said terminals, and a belt carrying roller having a shaft mounted in said casings.

6. In combination with a supporting framework, a transverse rock shaft, bearings therefor, brackets secured to the rock shaft extending upwardly therefrom and provided with supporting terminals, and a plurality of rollers rotatably mounted in pairs of said brackets at varying inclinations.

7. In combination with a supporting framework and a superimposed carrier belt, a transverse rock shaft, brackets secured thereon having upwardly extending roller-carrying arms and forwardly extending bracing arms, and belt supporting rollers carried in said brackets.

8. In combination with a rock shaft, a bracket secured thereon having an upwardly extending bearing portion provided with bifurcated slotted arms.

9. In combination with a rock shaft, a bracket secured thereon having an upwardly extending bearing portion provided with bifurcated slotted arms, and a separable supplemental bracket.

10. A combination bracket for belt carrying rollers consisting of a hub having a lateral bracing portion, an upwardly extending bearing bracket, and an attached oppositely disposed removable bearing bracket.

11. A combination bracket for belt carrying rollers consisting of a hub having a lateral bracing portion, an upwardly extending bearing bracket, an attached oppositely disposed removable bearing bracket, and means for connecting and disconnecting said brackets.

12. In belt supporting construction, a shaft having flanged supporting hubs, and a tubular roller having crimped engagement at its ends inwardly around the outer edges of the hub flanges, substantially as described.

13. A bearing for conveyer supporting rollers comprising a bracket having slotted cheeks thereon, a shaft bearing casing mounted between said cheeks, knife-edge trunnions on said casing engaging in said slots in said cheeks, said trunnions being positioned so as to permit movement longitudinally and transversely relative to said cheeks.

14. A bearing for conveyer supporting rollers comprising a bracket having slotted cheeks thereon, a shaft bearing casing mounted between said cheeks, knife-edge trunnions on said casing engaging in said slots in said cheeks, said trunnions being positioned so as to permit movement longitudinally and transversely relative to said cheeks, a roller shaft received in said casing, and the lower edge of said trunnions being in line with the center line of said shaft.

15. A bearing for conveyer supporting rollers comprising a bracket having laterally projecting slotted ears thereon, a shaft bearing casing mounted between the ears, knife-edge trunnions on said casing engaging in the slots in said ears, said trunnions being positioned on said casing so as to permit movement longitudinally and transversely relative to said ears.

16. A bearing for conveyer supporting rollers comprising a bracket having laterally projecting slotted ears thereon, a shaft bearing casing mounted between the ears, knife-edge trunnions on said casing engaging in the slots in said ears, said trunnions being positioned on said casing so as to permit movement longitudinally and transversely relative to said ears, a roller shaft received in said casing, and the lower edge of said trunnions being in line with the center line of said shaft.

17. A supporting mechanism for a carrying belt, consisting of a supporting structure, bearing brackets secured to and extending upwardly from said supporting structure, said brackets having bifurcated slotted arms, shaft-bearing casings mounted in said bifurcated arms, knife-edge trunnions on said casings engaging in the slots in said arms, roller shafts mounted in said casings, and the lower edge of said trunnions being in line with the longitudinal axis of said shafts so as to provide a balanced mounting for said shafts.

18. A supporting mechanism for a carrying belt, consisting of a supporting structure, bearing brackets secured to and extending upwardly from said supporting structure, said brackets having laterally projecting slotted ears thereon, shaft-bearing casings mounted between the ears on said brackets, knife-edge trunnions on said casings engaging in the slots in said ears, said trunnions being of such size as to provide clearance in said slots, roller shafts mounted in said casings, and the lower edge of said trunnions being in line with the longitudinal axis of said shafts so as to provide a balanced mounting for said shafts.

19. Supporting mechanism for a carrying belt, comprising a supporting structure, bearing brackets extending upwardly from said structure and having bearing portions provided with bifurcated slotted arms, shaft bearings mounted in said arms and having knife-edge trunnions engaging in the slots in said arms.

20. A bearing for conveyer supporting rollers comprising a bracket having a pair of flat bearing faces extending in a direction parallel with the longitudinal axis of the roller to be supported, a shaft bearing casing, knife-edge trunnions on said casing and supported on said bearing faces, said trunnions being positioned so as to permit movement longitudinally and transversely relative to said bearing faces.

21. A combination bracket for belt carrying rollers consisting of a hub, an upwardly extending bearing bracket having bifurcated slotted arms extending from opposite sides thereof.

22. In a supporting mechanism for a carrying belt, a supporting structure, a bearing bracket extending upwardly from said structure, and said bracket having bifurcated slotted arms extending from opposite sides thereof.

23. In a supporting mechanism for a carrying belt, a supporting structure, a bearing bracket extending upwardly from said structure, said bracket having bifurcated slotted arms extending from opposite sides thereof, and shaft bearings mounted in said arms and movable relative thereto, said bearings having knife-edge trunnions engaged in the slots in said arms.

In testimony whereof, I have hereunto signed my name.

FRANK E. SMITH.